Nov. 21, 1950     L. J. GARDAY     2,531,331
FREE PISTON ENGINE FUEL CONTROL

Filed Oct. 22, 1947     3 Sheets-Sheet 2

Inventor
Louis J. Garday.
By Thiess, Olson & Mecklenburger
Attys.

Nov. 21, 1950 L. J. GARDAY 2,531,331
FREE PISTON ENGINE FUEL CONTROL
Filed Oct. 22, 1947 3 Sheets-Sheet 3
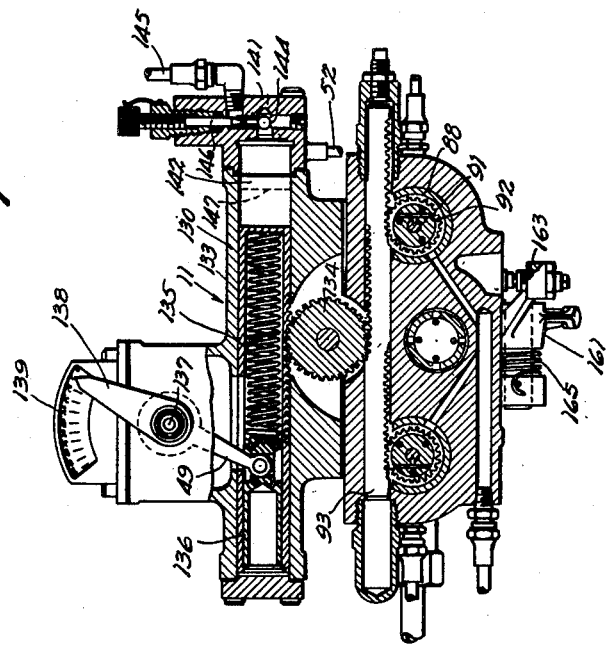
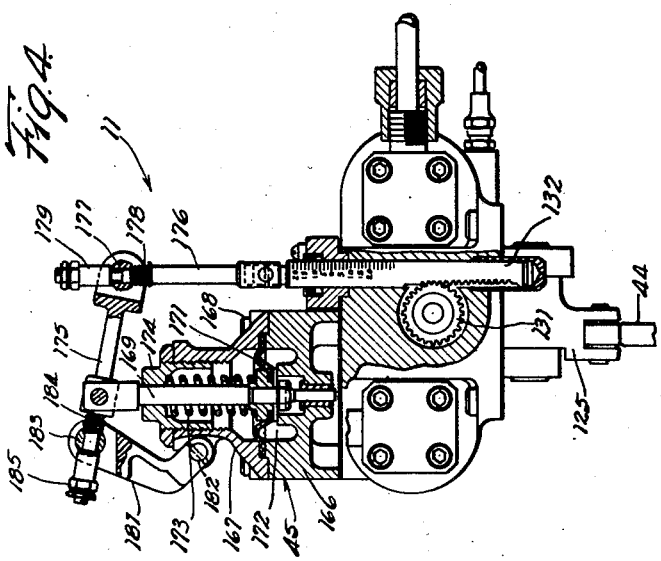
Inventor:
Louis J. Garday
By Thiess, Olson & Mecklenburger
Attys.

Patented Nov. 21, 1950

2,531,331

UNITED STATES PATENT OFFICE 2,531,331

FREE PISTON ENGINE FUEL CONTROL

Louis J. Garday, Glenview, Ill., assignor, by mesne assignments, to Louis G. Simmons, Chicago, Ill.

Application October 22, 1947, Serial No. 781,426

17 Claims. (Cl. 123—46)

This invention relates to gas generating apparatus operating with periodic injections of fuel and to fuel injection apparatus therefor, more particularly to such gas generating apparatus of the so-called free piston type, and it is an object of the invention to provide improved apparatus of this character.

It is a further object of the invention to provide improved fuel injector control means for apparatus of the character indicated.

It is a further object of the invention to provide improved apparatus of the character indicated wherein the fuel injection means supplies a positively metered amount of fuel from a high pressure source.

It is a further object of the invention to provide apparatus of the character indicated embodying improved means for controlling the timing of fuel injections and improved means for controlling the volume of fuel injected.

In carrying out the invention in one form, gas generating apparatus is provided comprising a combustion chamber for supplying gas under pressure, a chamber for receiving the gas from the combustion chamber, a fuel measuring chamber, and a piston movable therein under the influence of fuel under pressure for injecting the fuel in the measuring chamber into the combustion chamber. Valve means having differential areas exposed to the fuel under pressure are associated with the fuel measuring chamber for preventing the ejection of fuel therefrom, and timing means controlled by the generating apparatus are adapted to relieve the fuel pressure from one of the differential areas whereby the valve means open and the piston moves to produce fuel injection. Means responsive to the pressure in the gas receiving chamber cooperate with the timing means for varying the timing of the pressure relieving and governing means for determining the capacity of the fuel measuring chamber are provided together with means responsive to a condition of the generating apparatus operation for altering the fuel measuring capacity determined by the governing means.

For a more complete understanding of the invention, reference should now be had to the accompanying drawings in which:

Fig. 3 is a top plan view partially broken away of the apparatus shown in Fig. 2;

Fig. 4 is a fragmentary end view partially in section and partially broken away taken substantially along lines 4—4 of Fig. 2, and Fig. 5 is a sectional view partially broken away taken substantially along lines 5—5 of Fig. 3.

Figure 1:
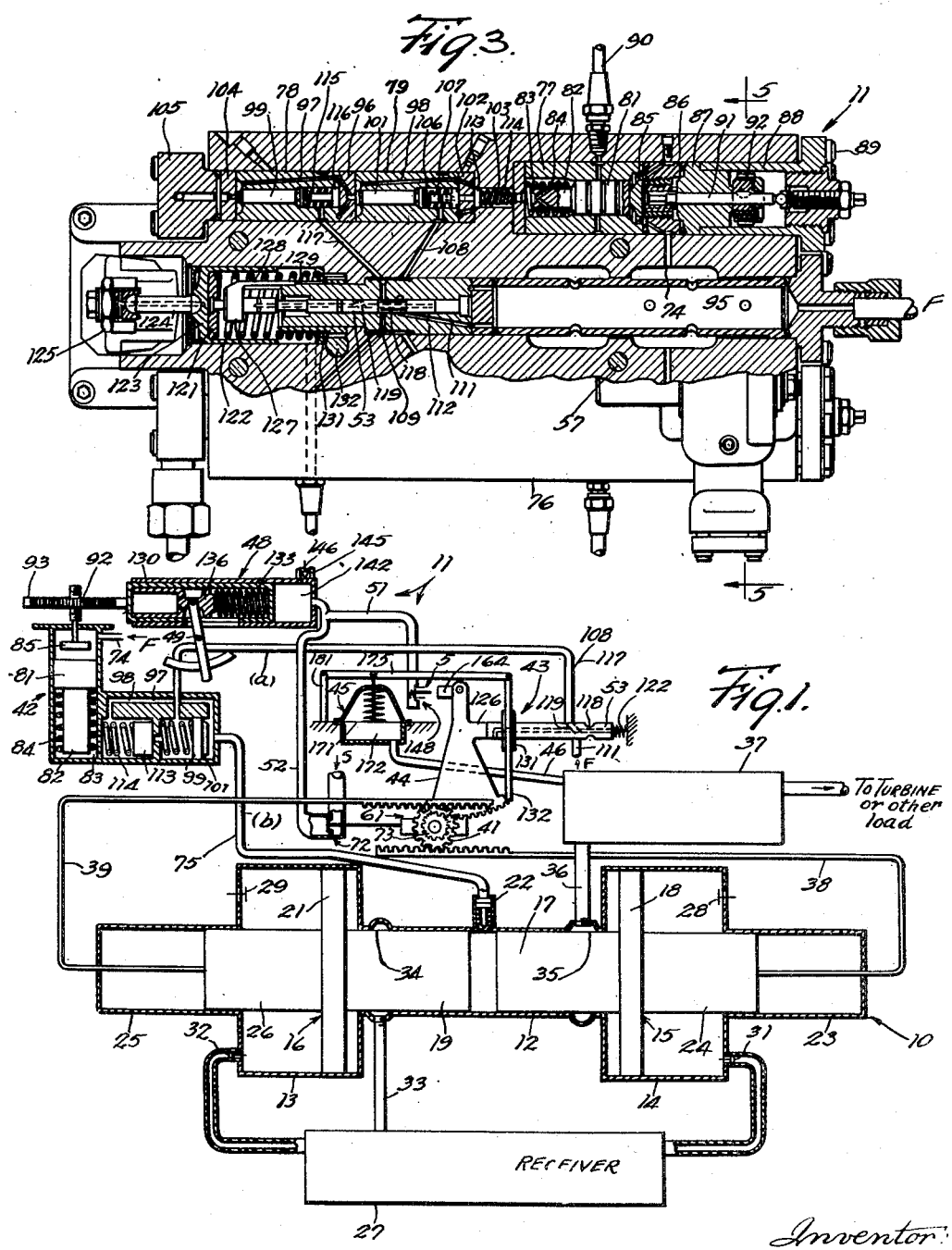
Figure 1 is a diagrammatic view of gas generating apparatus embodying the invention.

Referring to Fig. 1 of the drawings, the invention diagrammatically shown as embodied in gas generating apparatus of the so-called free piston type operating upon the principle of compression ignition, the gas generating apparatus including a combined motor and compressor unit 10 and fuel injecting apparatus 11, together with its control means.

Motor compressor unit 10 includes a motor cylinder 12, compressor cylinders 13 and 14 axially spaced at each end thereof, and pistons 15 and 16. Piston 15 comprises a motor piston portion 17 movable within motor cylinder 12, and a compressor piston portion 18 attached to, and preferably integral with piston portion 17, movable in compressor cylinder 14. Similar to piston 15, piston 16 comprises a motor piston portion 19 movable in motor cylinder 12, and a compressor cylinder portion 21 attached to, and preferably integral with, motor piston portion 19, movable in compressor cylinder 13. Motor piston portions 17 and 19 face each other within motor cylinder 12 and define a combustion chamber between their end surfaces into which fuel is adapted to be injected by an injection nozzle 22.

Extending axially from compressor cylinder 14 on the opposite side thereof from motor cylinder 12 is a cylinder 23 in which is movable a piston portion 24 forming part of piston 15 and axial therewith. Similarly, a cylinder 25 extends axially from cylinder 13 on the opposite side thereof from motor cylinder 12 in which is movable a piston portion 26 forming part of piston 16 and axial therewith. In the position shown in Fig. 1, motor piston portions 17 and 19 are virtually in the fuel ignition positions and compressor pistons 18 and 21 are in the position of having filled the compressor cylinders with air. At the same time, piston portions 24 and 26 are at their extreme inward positions in closed cylinders 23 and 25, thereby forming chambers containing air. When through the process of combustion motor piston portions 17 and 19 are forced outwardly to the scavenging position, the compressor cylinder portions 18 and 21 compress the air within the cylinders 14 and 13 respectively, forcing the compressed air into a receiver 27 and also forcing piston portions 24 and 26 respectively into cylinders 23 and 25 to compress the air therein which serves to return pistons 15 and 16 to the combustion positions.

Intake valves 28 and 29 and discharge valves 31 and 32 are associated respectively with compressor cylinders 14 and 13, the discharge valves being arranged within conduits connected with receiver 27 whereby the air compressed within cylinders 14 and 13 flows into receiver 27 on the compression or power stroke, but is prevented from flowing backwardly into the compressor cylinders during the intake stroke.

A duct or conduit 33 leads from receiver 27 to a series of circumferentially disposed air intake ports 34 in one end of combustion cylinder 12, at the other end of which there is a series of circumferentially disposed exhaust ports 35 communicating with a duct 36 leading to an exhaust gas receiver 37. Piston portions 17 and 19 being shown adjacent each other, ports 34 and 35 are covered up, but when the pistons are in their outward positions, piston portions 17 and 19 uncover respectively ports 35 and 34 thereby forming a complete passageway from receiver 27 through duct 33, ports 34, combustion cylinder 12, ports 35, and duct 36 to exhaust receiver 37. Consequently the compressed air in receiver 27 flows through cylinder 12 to receiver 37 thereby scavenging the combustion chamber and at the same time supplying compressed air to receiver 37 for use in a load such as a turbine, for example. The exhaust ports 35 preferably are arranged to be opened by piston 17 slightly before piston 19 opens ports 34 in order that the combustion gases under high pressure in cylinder 13 may flow into receiver 37 to reduce the pressure in cylinder 12 before the compressed air from receiver 27 flows therethrough. Accordingly, as a result of the engine operation, exhaust gas receiver 37 receives the exhaust gases resulting from the combustion of fuel as well as the air compressed in cylinders 13 and 14.

Pistons 15 and 16 are connected to each other through synchronizing racks 38 and 39 engaging with a gear 41. Consequently, the traveling free pistons are constrained to move with each other. If either of the pistons should tend to stick in its to and fro movements, a force is exerted on gear 41 tending to move it longitudinally, this tendency being used to stop engine 10 to prevent damage thereto, as will be described subsequently in this specification. Also, if the pistons tend to overtravel at the scavenging end of their stroke, mechanism to be described will be set into operation to reduce the amount of fuel supplied to the engine thereby reducing the amount of fuel supplied to the engine thereby reducing the length of piston travel.

Fuel is supplied from a high pressure source F in definite metered quantities by virtue of the fuel injector proper 42 forming part of injecting apparatus 11, the injector being connected to nozzle 22 through conduit 75 and to source F through conduit 74. Initiating operation of injector 42 is brought about by timing mechanism 43, also forming part of apparatus 11, the timing mechanism including a timing plunger 53 and a rocking cam 44 which is oscillated back and forth by the to and fro movements of the synchronizing racks. A pressure responsive element 45 is associated with timing mechanism 43 and is connected to exhaust receiver 37 through a duct 46 whereby the initial setting of the timing mechanism may be varied (i. e., the timing regulated) in accordance with the pressure in receiver 37. A governor mechanism 48 adapted to vary the amount of fuel injected by injector 42 is associated therewith and includes a lever 49 for producing a normal governor setting, the governor being adapted to have its setting reduced toward zero when pistons 15 and 16 overtravel at the scavenging end, and is adapted to have its setting reduced to zero when either of the pistons tends to stick in its to and fro movements. Reduction in the governor setting is effected by impulses of fuel under pressure through conduits 51 or 52 from a source S of relatively low fuel pressure, the fuel impulses through conduit 51 being effected by excessive movements of rocking cam 44, while the fuel impulses through conduit 52 are supplied when longitudinal movements of gear 41 occur.

The operation of the various individual elements illustrated in Fig. 1 is completely automatic. That is, when the pistons are in combustion position as shown, fuel injection is initiated by rocking cam 44, in one position through its lobe 126, moving the timing plunger 53 to a position connecting conduits 108, 117 to the exterior and if, as a result of the combustion, the pistons overtravel at the scavenging end, a lobe 164 on the rocking cam in its other position effects connection of conduit 51 to the source S thereby causing governor 48 to reduce the amount of fuel injected. Furthermore, if as a result of operation the pressure in receiver 37 should change, the pressure responsive element 45 responds to change the relative rotational position of plunger 53 to vary the fuel injection timing.

Figure 2:
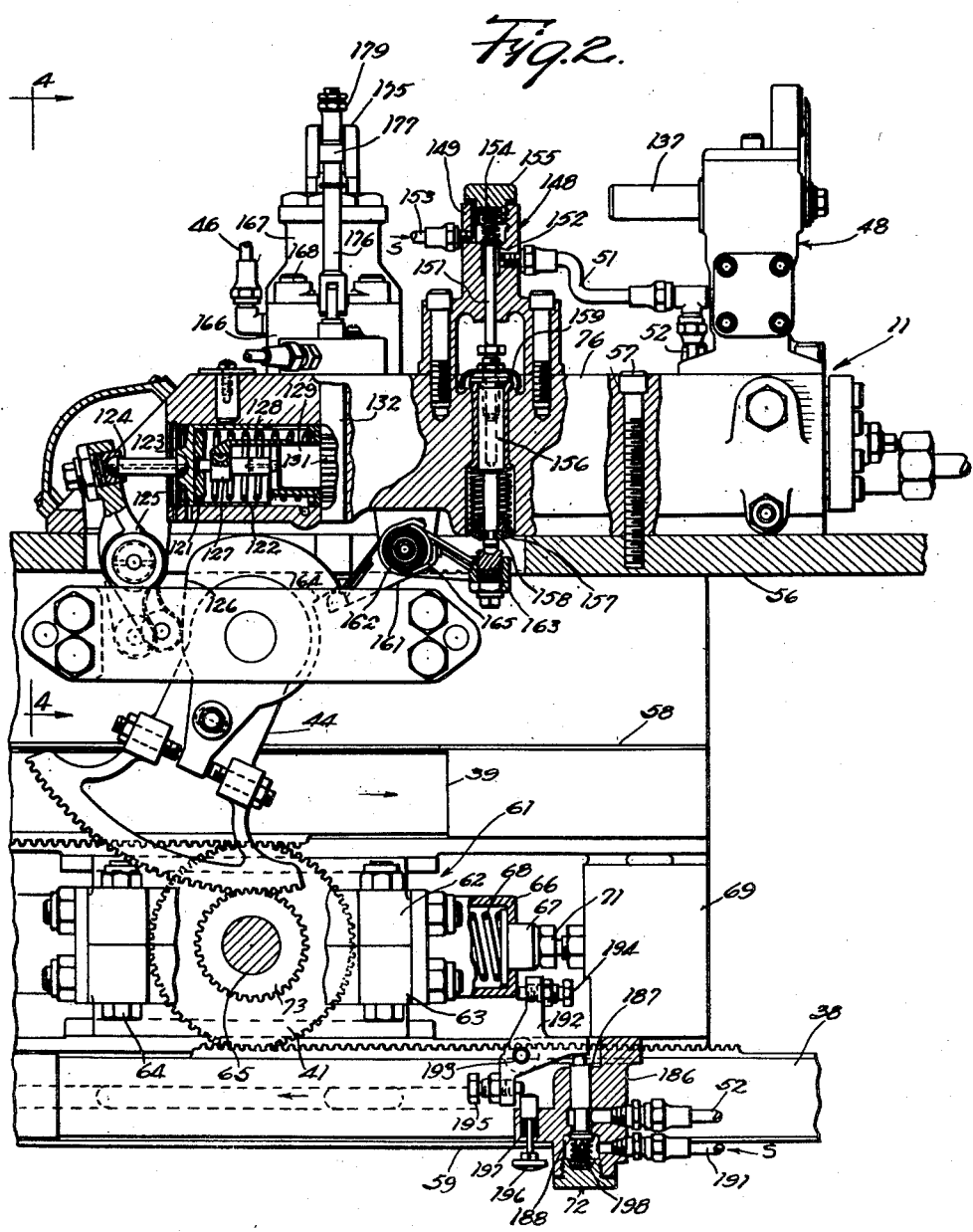
Fig. 2 is a detailed fragmentary side view partially broken away and on a larger scale of the apparatus shown in Fig. 1.

Referring to Fig. 2, in which the same reference characters are used for corresponding parts as in Fig. 1, the fuel injecting apparatus 11 is shown attached to a rigid member 56 which may form part of a gas generator by means of bolts 57. Rigidly associated with member 56 are the guides 58 and 59 within which the synchronizing racks 38 and 39 are adapted to slide. Supported between guides 58 and 59 is an assembly 61 including a pair of yoke members 62 and 63 held together by means of bolts 64 to support the gear 41 upon a shaft 65. At each end of assembly 61 there is a housing 66 having an opening through which the flanged plunger 67 projects, a spring 68 being provided in the housing for maintaining the plunger in its outward position. Also rigidly attached between guides 58 and 59 is an abutment 69 into which the stop 71 is adjustably threaded, the stop being adjusted to directly abut plunger 67. At the other end of assembly 61 there is an abutment similar to 69 and a stop similar to 71 so that assembly 61, including the gear 41, is normally stationarily held between abutments 69. Assembly 61, however, is slidable between the inner surfaces of guides 58 and 59. Consequently, whenever either of the synchronizing racks fail to move properly (one of the piston tends to stick, for example), movement of the other rack tends to move gear 41, and consequently assembly 61, longitudinally against stop 71. Small movements of assembly 61 open a safety shutoff valve 72 (Fig. 1) to completely cut off the engine fuel. Normal movements of synchronizing racks 38 and 39 merely produce rotation of gear 41, thereby causing rotation of a gear 73 attached to shaft 65 and meshing with corresponding teeth on rocker cam 44 to produce fuel injections and piston overtravel regulation.

The apparatus 11, including injector 42, fuel metering governor 48, timing mechanism 43, timing regulator 45, and related elements are embodied in a relatively unitary structure including a body member 76 shown in Figs. 2, 3, 4 and 5.

Considering first the fuel injector proper, and referring to Fig. 3, body 76 is provided with a pair of inwardly extending bores one of which is adapted to contain a piston guide 77 and the other of which is adapted to contain a pair of serially spaced valve guides 78 and 79. Within piston guide 77 there is a piston 81 including a reduced portion 82 at one end which forms, together with guide 77, a fuel ejection chamber 83, a spring 84 being arranged as shown to bias the piston toward its right hand position. A piston stop 85 is threaded in a piston stop guide 86 which is abutted by the shaft guide 87, the shaft guide being held in position and thereby holding the abutting elements within this bore of body 76 in position by means of a retainer sleeve 88 held to the body by bolts 89. A shaft 91 is rotatable within shaft guide 87 and is splined to piston stop 85 so that by rotating shaft 91 the position of the piston stop may be varied to determine the position of piston 81 within guide 77 and consequently to determine the capacity of ejection chamber 83. Shaft 91 is rotated by virtue of a gear 92 keyed thereto, the gear being engaged by a toothed rack 93 slidable in a bore within body 76, as is shown best in Fig. 5.

A series of passageways extend through piston stop guide 86, the passageways communicating with a passageway or duct 74 and hence with a central bore or chamber 95 connected to the high pressure source of fuel F. Thus, high fuel pressure is continually being exerted against the base of piston 81 tending to force it to fuel ejection position. Chamber 95 forms a substantially uniform supply of high pressure fuel necessary for optimum operation at all speeds and loads inasmuch as the source F may be some distance away and connected to chamber 95 through several feet of conduit. Piston 81 includes a series of grooves around its circumference, as shown, one or more of which communicate with radial holes through piston guide 77 and thence with a conduit 90 whereby fuel leakage past the piston and into the other mechanism is prevented.

Valve guides 78 and 79 are spaced from each other by a spacer 96, and passageways 97 and 98 respectively extend therethrough, the valve guides also being provided with centrally extending bores in which valve bodies 99 and 101 are adapted to move. The right end of valve guide 79 abuts against a spacer 102 having angularly extending passageways communicating with passageway 98 and with discharge chamber 83 through a bore 103. Spacer 96 at the left end of valve guide 79 includes a central bore and angularly extending passageways, the central bore being adapted to be closed by the left end of valve 101. The angular passageways in spacer 96 communicate with passageway 97 and thence through a central passageway in spacer 104, a nut 105, and conduit 75 to injection nozzle 22. The left end of valve 99 covers the passageway through spacer 104 and the left end of valve 101 closes the passageway through spacer 96 to prevent the flow of fuel to the injection nozzle except when desired. When valves 99 and 101 are held away from spacers 104 and 96, there is a continuous passageway from the injection nozzle through passageways 97 and 98 and bore 103 to discharge chamber 83.

The right end of valve guide 79 is enlarged to form a bore within which the head of valve 101, a spring 106, and a valve stop 107 are disposed, the spring 106 urging valve 101 against spaced 96 and valve stop 107 against spacer 102. The bore containing valve stop 107 is connected with a passageway 108 which is connected with radial passageways 109 and passageway or duct 111 in timing valve guide 112 (with parts in the position shown in Fig. 3) and hence with chamber 95 (source F). Consequently the fuel in chamber 95 fills the various passageways and exerts high pressure against the head of valve 101 and thereby urges this valve to close the passageways through spacer 96. Spacer 102 has a central bore adapted to be closed by a reloading valve 113 biased to a closed position by spring 114, the central bore being in communication with a longitudinal passageway as well as radial passageways in stop 107, and when reloading valve 113 is open there is a continuous passageway from source F to discharge chamber 83. Since the fuel in chamber 95 exerts its pressure against the base of piston 81, the fuel pressure on each side of piston 81 is the same, thereby allowing spring 84 to return piston 81 against the stop 85.

The right end of valve guide 78 is somewhat enlarged to form a bore containing the head of valve 99, a spring 115 and a valve stop 116, spring 115 urging valve 99 against spacer 104. The bore containing valve stop 116 is connected through passageway 117 with radial passageways 109, passageway 111, and source F. Accordingly, with parts in the position shown in Fig. 3, high fuel pressure is exerted against the head of valve 99 thereby holding this valve in its closed position.

The left ends of valves 99 and 101 are reduced in area and are very finely finished so that when the valves abut against spacers 96 and 104 fluid is unable to pass between the abutting surfaces. As a result, when the valves are closed the pressure of fuel in passageways 97 and 98 is exerted against only that portion of the areas on the valve ends which do not abut the spacers. However, the fuel pressure in passageways 108 and 117 exerts pressure against the full cross-sectional area of the valves at their right ends. Thus, even though high fuel pressure may be exerted in passageway 98, it is exerted against a smaller area of the valve than the fuel pressure in passageway 108 and consequently valve 101 maintains a closed position when full pressure is applied to both ends thereof. When valve 101 is closed, the fuel from discharge chamber 83 and passageway 98 cannot pass through the bores in spacer 96 and into passageway 97. Whatever fuel pressure may be exerted against the reduced area at the left end of valve 99 through passageway 97 and tending to open the valve is opposed by the high fuel pressure in passageway 117 being exerted against the full cross-sectional area of the valve body. Therefore valve 99 also maintains a closed position normally. When, however, valves 99 and 101 are open, the high fuel pressure being exerted against the base of piston 81 causes movement thereof to eject fuel through a continuous passageway extending from discharge chamber 83 to injection nozzle 22. Injection nozzle 22 includes a spring biased, closed needle valve which is lifted off its seat by the injection pressure. The nozzle spring has a spring constant such that the pressure necessary to open it is greater than the closing pressure of valves 99 and 101 which, accordingly, stay open until complete fuel ejection has occurred through the nozzle.

The initiation of fuel ejection is effected by the timing mechanism 43 also embodied within structure 11. The timing plunger 53 is slidable within a central bore in guide 112 and includes a circumferential groove 118 and a slot 119 extending angularly around the circumference thereof, the angular slot 119 being connected with a central passageway in the plunger which is connected to the exterior of the structure. In the position shown in Fig. 3, the circumferential groove 118 connects the passageway 111 to passageways 108 and 117 thereby supplying high pressure fuel to the heads of the valves. However, when plunger 53 is moved toward the right hand position, the radial passageways 109 are first closed by the full diameter of plunger 53 and thereafter when angular slot 119 comes into registry with radial passageways 109 the high fuel pressure existing in passageways 108 and 117 is relieved by the fuel therein flowing out through the longitudinal bore in plunger 53. Accordingly in this position there is low pressure being exerted against the heads of valves 99 and 101, and since the high pressure of the fuel in discharge chamber 83 is being exerted against the left end of valve 101 this valve opens against the bias of spring 106. Then the high pressure in chamber 83 (caused by high pressure being exerted against the base of piston 81 through passageway 74) is exerted through passageway 97 against the left end of valve 99 and this valve opens against the bias of spring 115. (The phase of operation just discussed is illustrated diagrammatically in Fig. 1.) When timing plunger 53 moves toward its left hand position (after fuel injection) the angular slot moves away from radial passageways 109 thereby closing the relief passageway, and when the plunger has moved to the position shown in Fig. 3, passageway 111 is again connected to passageways 108 and 117, thereby exerting high pressure against the heads of valves 99 and 101.

The pressure of fuel in passageways 97 and 98 and in discharge chamber 83 is low after fuel injection has occurred, thereby allowing the high pressure in passageways 108 and 117 with the aid of springs 115 and 106 to close valves 99 and 101. Since the pressure in discharge chamber 83 is also low, the high pressure in passageway 108 is exerted through the central passageway in valve stop 107 and lifts reloading valve 113 off its seat. This equalizes the pressure on each side of piston 81 and permits spring 84 to move the piston against stop 85, thereby filling discharge chamber 83 with fuel. During the fuel ejection process when the pressure in passageway 108 is low, the high pressure fuel in discharge chamber 83 is exerted against reloading valve 113, maintaining it in a tightly closed position.

The timing plunger 53 is connected to a collar 121 which is urged outwardly by a spring 122 (Figs. 2 and 3). Collar 121 abuts against the inside of a cup 123 including a semi-cylindrical bearing surface into which is received one end of the rocker link 124. The other end of rocker link 124 is received in a corresponding bearing surface at one end of tappet member 125 pivoted at its center to structure 11 and adapted at its other end to contact a cam surface or lobe 126 on cam 44. Lobe 126 is so arranged that in the position shown in Fig. 2 valve plunger 53 is in the position shown in Fig. 3.

Movement of synchronizing racks 38 and 39 toward combustion position moves cam 44 by virtue of the gears 73 and 41 to the position shown in Fig. 1 where lobe 126 has moved tappet member 125, and consequently plunger 53, to a fuel ejecting position. Thus the movement of the synchronizing racks through cam 44 and plunger 53 produces timing of the fuel injection which occurs whenever slot 119 comes into communication with radial slots 109 and hence passageways 108 and 117. Since slot 119 extends angularly around the surface of plunger 53, the relative rotational position thereof determines the instant at which the angular slot comes into registry with slots 109. Consequently, variations in timing may be produced by rotating the valve plunger. This is accomplished by rotating the valve guide 127 from which extends a tongue 128 slidable in a slot in flange 129, flange 129 being part of a gear 131 engaging with a toothed rack 132 (see also Fig. 4). Toothed rack 132 moves in a vertical bore in body 76 and in so doing rotates the plunger 53, thereby varying the relative position of angular slot 119.

The final position of the timing plunger at fuel injection is determined by the final position of the synchronizing racks and hence by the power pistons at the combustion end of the stroke. A small time interval is needed for piston 81 to produce a complete fuel injection after initiation thereof by the registry of grooves 119 and radial holes 109 due to the inertia of the fuel and parts and the friction present. This time delay is obtained by virtue of the spacing between circumferential slot 118 and angular slot 119. It will be seen that when slot 119 and radial holes 109 register, this occurring for fuel injection irrespective of the final piston position, the timing plunger must move toward the left at least the distance between slot 119 and groove 118 to bring groove 118 into communication with radial holes 109 and thereby stop fuel injection by the application of high pressure through passageways 108 and 117 against the heads of valves 99 and 101. Complete fuel injection will have occurred due to this time interval and is not hindered by the premature application of high pressure to the valve heads.

Body 76 includes two series of valves (one being valves 99 and 101) and two injection pistons (one being piston 81) (see Figs. 3 and 5), so that two fuel injections may be produced simultaneously. The dual portions of the apparatus are duplicates and only one has been described.

Governor mechanism 48 for varying the capacity of fuel discharge chamber 83 forms part of the structure 11 at the right end thereof. Referring particularly to Fig. 5, the governor mechanism comprises a housing 130 including a bore within which a piston 133 is adapted to move, one side of the piston including teeth engaging with corresponding teeth on a gear 134. Gear 134 also engages with teeth on rack 93, and as a consequence, when piston 133 moves to and fro, rack 93 moves to and fro thereby rotating gear 92 to effect movement of piston stop 85 (Fig. 3). Piston 133 is hollow and abutting one end thereof is a spring 135, the other end of which abuts against a cross head 136 movable inside of the piston. Cross head 136 is pivotally attached to an arm 49 in turn pivotally mounted in housing 130 on a shaft 137 keyed to arm 49. Rotating shaft 137 moves arm 49 and consequently piston 133 to a desired position, an indicating arm 138 being attached to shaft 137 whereby the load may be indicated on a scale 139. The shaft 137 may be attached to controlling mechanism such as a throttle, for an example, not shown, by means of which the desired engine load may be set.

The right end of the bore in which piston 133 moves is closed by a by-pass needle body 41 to form a chamber 142. Fuel under pressure may be supplied to chamber 142 through conduits 51 or 52 and opening 144, fuel flowing out of chamber 142 through a conduit 145 as determined by the adjustable needle valve 146. In the position shown in Fig. 5, the governor is set for minimum or zero load. Consequently fuel under pressure flowing into chamber 142 will not affect the position of piston 133. Supposing, however, that the governor is set to a position, for example, fifty per cent load, in which event the right end of piston 133 will occupy a position shown by the broken line 147 and the fuel ejecting piston 81 (Fig. 1) will occupy an initial position so determined and discharge chamber 83 will contain an amount of fuel corresponding to fifty per cent load. During operation, chamber 142 is filled with fuel at atmospheric pressure and, now, if fuel under pressure flows ito chamber 142 this pressure will cause piston 133 to move, thereby compressing spring 135, since arm 49 remains stationary as determined by the initial governor setting. The compressed spring, however, urges piston 133 toward broken line 147, thereby tending to force the oil in chamber 142 to flow out past needle valve 146. The needle valve may be adjusted to determine any particular rate of flow desired.

The unitary structure 11 is more completely described and claimed in the copending application Serial No. 781,427, filed October 22, 1947, entitled Fuel Pressure Operated Fuel Injector, to Louis J. Garday, and assigned to the same assignee as the present invention.

Bearing in mind the structure of the various elements described in connection with Figs. 2, 3, 4, and 5, the integrated operation thereof may be best understood by referring to Fig. 1. In Fig. 1 the pistons are in the combustion positions and consequently synchronizing racks 38 and 39 have approached each other thereby rotating gear 41 to move cam 44 into a position where lobe 126 has moved plunger 53 to a point where angular slot 119 communicates with ducts 108 and 117. In this position the fluid pressure against the rear of valves 99 and 101 has been relieved and the high pressure from discharge chamber 83 has lifted these valves off their seats and injected fuel into the combustion chamber through conduit 75 and discharge nozzle 22. Combustion takes place as a result of the high temperature in the combustion chamber due to the high compression of the air therein. As the combustion continues after fuel injection, pistons 15 and 16 move outwardly effecting movement of synchronizing racks 38 and 39 away from each other and consequently rotating gear 41 to move cam 44 and lobe 126 away from plunger 53. The plunger is then moved by spring 122 to a position where groove 118 connects conduits 108, 117 and 111 to the high pressure source of fuel thereby refilling discharge chamber through valve 113 and closing valves 99 and 101 as has been described.

Since pistons 15 and 16 are free, in the sense that they do not have a fixed degree of movement, provision must be made to prevent the pistons from overtraveling. In conventional engines having crank shafts, pistons are attached by means of connecting rods to the crank shaft and, therefore, the piston's freedom of movement is limited, but in an engine of the so-called free piston type, the pistons are not so constrained and other means are provided to prevent the pistons from overtraveling and consequently coming into contact with each other or the ends of the cylinders in which they move. Rigid mechanical stops are impractical in view of the fact that the pistons cannot be allowed to come into hard contact with a fixed stop since this would cause breakage of such members in many instances. In the present invention, at the combustion end of the travel, the compression of the air in the combustion chamber is sufficient to prevent the pistons from coming into contact with each other and piston overtravel at the scavinging end of the stroke is controlled by cutting down the amount of fuel supplied to the combustion chamber whenever the pistons tend to overtravel. Referring to Fig. 1, it will be seen that when pistons 15 and 16 are in their outward position the synchronizing racks 38 and 39 have moved cam 44 to a position where cam lobe 164 comes into contact with the plunger of valve 148 which may be termed an overtravel governor valve. Normally cam 44 does not move sufficiently far to open valve 148. Valve 148 is in conduit 51 connected to a source of fuel under pressure S, and when this valve is opened by lobe 164 due to piston overtravel, fuel under pressure is transmitted to chamber 142 through conduit 51, thereby moving piston 133 toward the left and consequently cutting down the capacity of discharge chamber 83.

Referring more particularly to Fig. 2, one form of valve 148 and its actuating mechanism are disclosed. A housing 149 is attached to the top of body 76 by bolts, as shown. A vertical bore extends through body 149 within which a rod 151 is movable, the rod including a valve head 152 at its upper end for opening and closing a passageway between conduits 153 and 51, conduit 51 being connected to chamber 142. Valve head 152 is held downwardly upon its seat by a spring 154 bearing against a cap 155 closing the top of the housing. The lower end of valve stem 151 bears against the adjusting screw of a push rod 156, the push rod being slidable within a bore through body 76. A collar 157 is held to the lower end of push rod 156 by means of a split retaining ring 158 and a spring is arranged to bear against collar 157 to hold the push rod in its lowermost position, an enlarged flange 159 forming part of the upper end of the push rod to determine the final position thereof. A rocker 161 is pivotally attached to body 76 on a shaft 162, one end thereof being provided with a semi-spherical bearing seat 163 to contact with a corresponding bearing at the lower end of push rod 156. The other end of the rocker arm is adapted to contact the abutment or lobe 164 associated with cam 44. A torsional spring 165 surrounding shaft 162 has one of its ends held to rocker 161 and the other of its ends stationarily held whereby the rocker is biased to continuously bear against the lower end of push rod 156.

In the position shown in Fig. 2, the synchronizing racks 38 and 39 being in their scavenging or outward positions, the fuel injector valves are closed and if the pistons have not traveled beyond the permissible limit the valve 148 is also closed, that is, valve head 152 is on its seat. If, however, the pistons have overtraveled, lobe 164 on cam 44 has moved rocker arm 161 and consequently has moved the push rod upwardly to lift valve head 152 off its seat. This allows an impulse of fuel to flow inwardly through conduit 153, through conduit 51 to chamber 142, thereby moving piston 133 (Fig. 5) to a position reducing the capacity of fuel discharge chamber 83. If the amount of overtravel is large, valve head 152 is lifted farther off its seat allowing a greater amount of fuel to flow into chamber 142, and consequently moving piston 133 a greater distance away from its preset position, that is, closer toward the position of zero fuel capacity. Conversely, if the amount of overtravel is small, valve head 152 is lifted only a short distance off its seat and only a small amount of fuel flows into chamber 142, and governor piston 133 is moved only a short distance away from its preset position. As soon as pistons 15 and 16 move away from the scavenging end positions, that is, toward the combustion end, valve head 152 moves to its closed position under the influence of springs 154 and the fuel in chamber 142 is trapped there to hold piston 133 in its displaced position. Consequently, the amount of fuel supplied to the engine thereafter from chamber 83 is reduced and the travel of the pistons on the next combustion stroke is reduced by an amount proportional to the displacement of piston 133, i. e., proportional to the overtravel. The oil in chamber 142 is slowly forced out through adjustable needle valve 146 under the influence of spring 135. Thus, when the stroke of pistons 15 and 16 has once been cut down following their overtravel, the amount of fuel supplied to the engine is cut down for several succeeding strokes of the pistons until the oil within chamber 142 has leaked out. When this has occurred governor piston 133 will be in its normal preset position and the generator will be receiving the amount of fuel determined by the governor and indicated on scale 139.

The overtravel governor valve 148 and its operating mechanism including rocker 161 together with the governor mechanism 48 act as a regulating governor to hold the fuel at the desired throttle setting at higher generator speeds, even though overtravel occurs. Suppose the pressure of gas receiver 37 is high, i. e. high load. Then, the speed of the pistons and the synchronizing racks is high. Now, if piston overtravel occurs, the time valve head 152 is off its seat is small and only a small amount of fuel enters chamber 142. Consequently, only a small change in the position of piston 133 is made and the time for the piston to return to full fuel position is small. Hence the overtravel is reduced in small amounts without sudden change in generator speed. On the other hand, if receiver 37 pressure is low, i. e. low generator load, the speed is low and, consequently, if piston overtravel occurs valve 152 is open longer with a resultant larger movement of piston 133. The capacity of metering chamber 83 is thus cut down further and a longer time is needed for it to return to the full value of the throttle setting. Thus, the return to full fuel setting is slower and the reduction in overtravel is faster at low loads than at high loads.

Pressure in the combustion chamber is a function of the pressure in exhaust receiver 37 as well as the pressure in scavenging air receiver 27, since the compressed air in receiver 27 flows through the combustion chamber at the scavenging end of power pistons 15 and 16 and thereby determines the actual pressure of the air in cylinder 12 when the pistons begin the return stroke. Accordingly, with load variations, the pressure within the combustion chamber may vary, these following the variations in the pressure of receiver 37. Since it is desirable in internal combustion engines to produce combustion at a certain point in the piston travel determined by the load on the engine as well as other factors, the timing of the fuel injection is varied in accordance with the pressure in receiver 37, this being accomplished by connecting receiver 37 through the conduit 46 to the pressure responsive device 45.

Referring to Figs. 2 and 4, the pressure responsive mechanism 45 is associated with the left end of structure 11 and comprises a base 166 and a regulator body 167, these two members being attached to each other and to the body 76 by bolts 168. Disposed centrally of body 167 there is a regulator shaft 169 at the lower end of which is a circular diaphragm 171 is attached, the outer periphery of the diaphragm being clamped in fluid-tight relation to body 167 and base 166, and defining a chamber 172 connected to exhaust receiver 37 through conduit 46. A spring 173 bears against a collar on the lower end of shaft 169 and against an adjusting nut 174 at the upper end of body 167, the force of spring 173 being balanced against that of the pressure in chamber 172. The upper end of shaft 169 is forked and a lever 175 is disposed between the forks and pivoted thereto. One end of lever 175 is split and is attached to a link 176 by means of a swivel pin 177, the link 176 including a reduced portion at one end which is surrounded by a spring 178 on one side of swivel pin 177. On the other side of swivel pin 177, the link 176 is threaded and is provided with an adjusting nut 179. The other end of lever 175 is attached to a fulcrum link 181 pivoted to body 167 by a shaft 182, the other end of link 181 being split and pivoted to lever 175 by means of a swivel pin 183. On one side of pin 183 there is a spring 184, and on the other side there is an adjusting nut 185. Link 176 being connected to rack 132 as shown, adjusting nuts 179 and 185 may be positioned to adjust the position of the rack, which in turn shifts the relative rotational position of timing plunger 53 to a desired value which for normal pressure conditions within exhaust receiver 37 and for a particular load condition on the gas generator will produce proper timing of fuel injection.

When the generator is not operating, there is no pressure in chamber 172 and spring 173 positions rack 132 to its lowest position. When the generator is starting, the pressure in chamber 172 will be low and consequently the position of rack 132 is maintained in its lowest position, as a result of which the fuel injection would occur when the pistons are closest to each other in the piston chamber, that is, the fuel injection would occur as late as possible in the cycle. As the pressure increases in exhaust receiver under increasing load conditions, the shaft 169 is moved upwardly against the bias of spring 173 thereby moving rack 132 and consequently shifting the rotational position of plunger 53 to effect fuel injection earlier in the operating cycle. Referring to Fig. 1, it will be seen that as diaphragm 171 is forced upwardly, the rack 132 moves upwardly to rotate plunger 53 counterclockwise when viewing the left end thereof, thereby positioning slot 119 so that it comes into communication with the conduits 108, 117 sooner, or while pistons 15 and 16 still have a short distance to travel. When the pressure in exhaust receiver goes down, spring 173 returns the diaphragm to a lower position thereby reversely rotating plunger 53 to bring a portion of slot 119 into communication with conduit 108, 117 at a latter point. The stiffness of spring 173 may be so chosen and the adjustment of nut 169 so made, together with positioning of adjusting nuts 179 and 185, that the rotational position of plunger 53 is correct for proper timing under a particular load condition, i. e., full load. In this case diaphragm 171 would occupy an intermediate position and consequently could move to compensate for pressure changes in receiver 37 requiring a greater travel of the plunger.

The pistons 15 and 16 being free pistons and being returned to the combustion position by air compressed in cylinders 23 and 25, there may be a tendency for one or both of the pistons to develop excessive friction or actually stick in their movements, thereby placing excessive strain on the moving parts unless the generator stops operating. As has already been described, when this condition occurs the assembly 61 moves laterally and actuates a safety valve 72 to supply fuel to chamber 142 of the governor in sufficient pressure and in sufficient amount to shift cylinder 133 to a position of zero fuel capacity. Consequently the generator stops operating.

Referring to Fig. 2, valve 72 comprises a body 186 attached to abutment 69. The body 186 includes a central bore in which a plunger 187 is movable, the plunger including a valve head 188 cooperating with a valve seat to open and close a passageway from conduit 52 to conduit 191, which is connected to the source of fuel under pressure. Associated with body 186 is a trip lever 192 having three portions and pivoted on a shaft 193, one of the portions being provided with an adjusting screw 194 abutting the housing 66. An adjusting screw 195 cooperating with a manual reset button 196 is threaded to another portion of the trip lever, and the third portion thereof abuts against the valve plunger 187. In the normal position of the safety valve parts, adjusting screw 194 abuts housing 66, adjusting screw 195 holds manual reset button 196 outwardly against the bias of spring 197, and valve head 188 is maintained on its seat by a spring 198. In this position there is no fuel flowing from conduit 191 to conduit 52 and the operation of the generator is unaffected.

If, however, one of the generator pistons should tend to stick or develop excessive friction, the assembly 61 moves against the bias of spring 68 and the trip lever 192 forces valve plunger 187 down to allow fuel under pressure to flow from conduit 191 to chamber 142. When the trip lever 192 is pivoted a very small amount by a very small movement of assembly 61, the adjusting screw 195 is moved sufficiently so that spring 197 moves manual reset button 196 into a position blocking the return of trip lever 192 to normal. Hence fuel under pressure is continually exerted against the base of piston 133 thereby maintaining a shut-off fuel condition until an attendant comes and pulls the manual reset button 196 outwardly to allow spring 198 to return the valve plunger 187 to its normal position.

Thus, during the operation of the gas generator, the injection of fuel, the timing of the fuel injections, the regulation of the governor to account for overtravel of the free pistons, and the stopping of the generator in the event that the pistons develop excessive friction are automatically taken account of.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

Having thus described the invention what is claimed and desired to be secured by Letters Patent is:

1. Gas generating apparatus comprising a motor cylinder, a pair of compressor cylinders respectively disposed at opposite ends of said motor cylinder, a pair of free pistons each including a motor piston portion and a compressor piston portion movable between combustion and scavenging positions, each of said free pistons being arranged with the compressor piston portion thereof in a compressor cylinder and with the motor piston portions thereof facing each other in said motor cylinder and defining a combustion chamber for supplying gas under pressure, means for synchronizing the movement of said pistons, means for returning said pistons from scavenging positions to combustion positions, a receiver for the combustion gases, injection means operative when said pistons are at combustion position for injecting fuel into said combustion chamber, means responsive to the pressure in said receiver for varying the timing of said fuel injection, governing means for determining the amount of fuel injected by said injection means, and means responsive to the position of said pistons at the scavenging end of piston movement for varying the amount of fuel determined by said governing means.

2. Gas generating apparatus comprising a combustion chamber for supplying gases under pressure, a chamber for receiving the gases from said combustion chamber, fuel pressure operated means for injecting measured amounts of fuel into said combustion chamber, means for initiating operation of said injecting means, means responsive to the pressure in said gas receiving chamber for varying the timing of said initiation, governing means for determining said measured amount of fuel, and means responsive to a condition of the generating apparatus operation for altering the amount of fuel determined by said governing means.

3. Gas generating apparatus comprising a combustion chamber for supplying gas under pressure, a chamber for receiving the gas from said combustion chamber, a fuel measuring chamber, a piston movable in said chamber under the influence of fuel under pressure for injecting the fuel in said measuring chamber into said combustion chamber, valve means having differential areas exposed to said fuel pressure for preventing ejection of fuel from said measuring chamber, timing means controlled by said generating apparatus for relieving the fuel pressure from one of said differential areas whereby said valve means open and said piston moves to produce fuel injection, means responsive to the pressure in said gas receiving chamber for varying the timing of said fuel injection, governing means for determining the capacity of said fuel measuring chamber, and means responsive to a change in piston stroke for altering the fuel measuring chamber capacity determined by said governing means.

4. Gas generating apparatus comprising a combustion chamber for supplying gas under pressure, a fuel measuring chamber, a piston movable therein under the influence of fuel under pressure for injecting the fuel in said measuring chamber into said combustion chamber, means controlled by said generating apparatus for timing said fuel injection, governing means for determining the initial position of said piston in said measuring chamber for determining the volume of fuel ejected therefrom, fluid pressure responsive means for altering said initial piston position, and means responsive to a stroke of said gas generating apparatus for supplying fluid under pressure to said fluid pressure responsive means.

5. Gas generating apparatus operating with periodic injections of measured amounts of fuel comprising a combustion chamber for supplying gas under pressure, a fuel measuring chamber, an injection piston movable in said measuring chamber under the influence of fuel under pressure for injecting the fuel in said measuring chamber into said combustion chamber, means controlled by said generating apparatus for timing said fuel injection, governing means for determining the initial position of said injection piston in said measuring chamber for determining the volume of fuel ejected therefrom, said governing means including a governing chamber and a governing piston therein biased to maintain the initial position of said injecting piston and being movable in one direction in said governing chamber for altering the initial position of said injecting piston, means responsive to a condition of said generating apparatus operation for supplying a pulse of fluid under pressure to said governing chamber thereby to move said governing piston in said one direction against its bias, and bleeding means associated with said governing chamber whereby said pulse of fluid is forced out of said governing chamber by said governing piston and its bias and said governing piston returns to its initial position.

6. Gas generating apparatus comprising a combustion chamber for supplying gas under pressure, a fuel measuring chamber, a piston movable therein under the influence of fuel under pressure for injecting the fuel in said measuring chamber into said combustion chamber, means controlled by said generating apparatus for timing said fuel injection, governing means for determining the initial position of said piston in said measuring chamber for determining the volume of fuel ejected therefrom, fluid pressure responsive means having an initial position and being movable to alter said initial position, means responsive to a condition of said gas generating apparatus for supplying a pulse of fluid under pressure to said fluid pressure responsive means, and means for bleeding away the fluid of said pulse whereby said fluid pressure responsive means returns to its initial position.

7. Gas generating apparatus operating with periodic injections of measured amounts of fuel comprising a combustion chamber for supplying gas under pressure, a chamber for receiving the gas from said combustion chamber, a fuel measuring chamber, an injection piston movable therein under the influence of fuel under pressure for injecting the fuel in said measuring chamber into said combustion chamber, valve means having differential areas exposed to said fuel under pressure for preventing ejection of fuel from said measuring chamber, timing means controlled by said generating apparatus for relieving the fuel pressure from one of said differential areas whereby said valve means opens and said injecting piston moves to produce said fuel injection, means responsive to the pressure in said gas receiving chamber for varying the timing of said pressure relieving means, governing means for determining the initial position of said injection piston in said measuring chamber for determining the volume of fuel ejected therefrom, said governing means including a governing chamber and a governing piston therein biased to maintain the initial position of said injection piston and movable in one direction for altering the initial position of said injecting piston, means responsive to a condition of said generating apparatus for supplying a pulse of fluid under pressure to said governing chamber thereby to move said governing piston in said one direction against its bias, and bleeding means associated with said governing chamber whereby said pulse of fluid is forced out of said governing chamber by said governing piston and its bias.

8. Gas generating apparatus comprising a motor cylinder, a compressor cylinder at one end thereof, a free piston including a motor piston portion in said motor cylinder defining a combustion chamber for supplying gas under pressure and a compressor piston portion in said compressor cylinder, said free piston being movable between combustion and scavenging positions, means for returning said piston from scavenging position to combustion position, a receiver for said gas from said combustion chamber, injection means operative when said piston is at combustion position for injecting fuel into said combustion chamber, means responsive to the pressure in said receiver for varying the timing of fuel injection by said injection means, governing means for determining the amount of fuel injected by said injection means, and means responsive to the position of said piston at the scavenging end of piston movement for varying the amount of fuel determined by said governing means.

9. Gas generating apparatus comprising a motor cylinder, a pair of compressor cylinders respectively disposed at opposite ends of said motor cylinder, a pair of free pistons movable between combustion position and scavenging positions, each piston including a motor piston portion in said motor cylinder and a compressor piston portion in respective compressor cylinders, said motor piston portions facing each other and forming a combustion chamber for supplying gas under pressure, means for synchronizing movement of said pistons, a receiver for the gases from said combustion chamber, a fuel measuring chamber, an injection piston movable therein under the influence of fuel under pressure for injecting the fuel in said measuring chamber into said combustion chamber, valve means having differential areas exposed to said fuel under pressure for preventing ejection of fuel from said measuring chamber, timing means controlled by said apparatus when said pistons are at combustion position for relieving the fuel pressure from one of said differential areas whereby said valve means opens and said injecting piston moves to produce said fuel injection, and means responsive to the pressure in said receiver for varying the timing of said pressure relieving means.

10. Gas generating apparatus comprising a motor cylinder, a pair of compressor cylinders respectively disposed at opposite ends of said motor cylinder, a pair of free pistons movable between combustion position and scavenging positions, each piston including a motor piston portion in said motor cylinder and a compressor piston portion in respective compressor cylinders, said motor piston portions facing each other and forming a combustion chamber for supplying gas under pressure, means for synchronizing movement of said pistons, a receiver for the gases from said combustion chamber, a fuel measuring chamber, an injection piston movable therein under the influence of fuel under pressure for injecting the fuel in said measuring chamber into said combustion chamber, valve means having differential areas exposed to said fuel under pressure for preventing ejection of fuel from said measuring chamber, timing means controlled by said apparatus when said pistons are at combustion position for relieving the fuel pressure from one of said differential areas whereby said valve means opens and said injecting piston moves to produce said fuel injection, and means responsive to the pressure in said receiver for varying the timing of said pressure relieving means, governing means for determining the initial capacity of said fuel measuring chamber, and means responsive to the position of said pistons at the scavenging end of piston travel for altering said initial fuel measuring chamber capacity.

11. Gas generating apparatus comprising a motor cylinder, a pair of compressor cylinders respectively disposed at opposite ends of said motor cylinder, a pair of free pistons movable between combustion and scavenging positions, each piston including a motor piston portion in said motor cylinder and a compressor piston portion in respective compressor cylinders, said motor piston portions facing each other and forming a combustion chamber, means for synchronizing movement of said pistons, a fuel measuring chamber, an injecting piston movable therein under the influence of fuel under pressure for injecting the fuel in said measuring chamber into said combustion chamber, timing means controlled by said generating apparatus when said pistons are at combustion position for effecting said fuel injection, governing means determining the initial position of said injecting piston in said measuring chamber for determining the volume of fuel ejected therefrom, fluid pressure responsive means for altering said initial piston position, and means responsive to the position of said free pistons at the scavenging end of piston travel for supplying fluid pressure to said fluid pressure responsive means.

12. Gas generating apparatus comprising a motor cylinder, a pair of compressor cylinders respectively disposed at opposite ends of said motor cylinder, a pair of free pistons movable between combustion and scavenging positions, each piston including a motor piston portion in said motor cylinder and a compressor piston portion in respective compressor cylinders, said motor piston portions facing each other and forming a combustion chamber, means for synchronizing movement of said pistons, a fuel measuring chamber, an injecting piston movable therein under the influence of fuel under pressure for injecting the fuel in said measuring chamber into said combustion chamber, timing means controlled by said generating apparatus when said pistons are at combustion position for effecting said fuel injection, governing means determining the initial position of said injecting piston in said measuring chamber for determining the volume of fuel ejected therefrom, said governing means including a governing chamber and a governing piston therein biased to maintain the initial position of said injecting piston and movable in one direction in said governing chamber for altering the initial position of said injecting piston, means responsive to the position of said free pistons at the scavenging end of piston travel for supplying a pulse of fluid under pressure to said governing chamber thereby to move said governing piston in said one direction against its bias, and bleeding means associated with said governing chamber whereby said pulse of fluid is forced out of said governing chamber by said governing piston and its bias and said governing piston returns to its initial position.

13. Gas generating apparatus comprising a motor cylinder, a pair of compressor cylinders respectively disposed at opposite ends of said motor cylinder, a pair of free pistons movable between combustion and scavenging positions, each piston including a motor piston portion in said motor cylinder and a compressor piston portion in respective compressor cylinders, said motor piston portions facing each other and forming a combustion chamber, means for synchronizing movement of said pistons, a fuel measuring chamber, an injecting piston movable therein under the influence of fuel under pressure for injecting the fuel in said measuring chamber into said combustion chamber, timing means controlled by said generating apparatus when said pistons are at combustion position for effecting said fuel injection, governing means determining the initial position of said injecting piston in said measuring chamber for determining the volume of fuel ejected therefrom, fluid pressure responsive means having an initial position corresponding to said injecting piston initial position and being movable to alter said injecting piston initial position, means responsive to the position of said free pistons at the scavenging end of piston travel for supplying a pulse of fluid under pressure to said fluid pressure responsive means, and means for bleeding away the fluid of said pulse whereby said fluid pressure responsive means returns to its initial position.

14. Gas generating apparatus comprising a motor cylinder, a pair of compressor cylinders respectively disposed at opposite ends of said motor cylinder, a pair of free pistons movable between combustion position and scavenging positions, each piston including a motor piston portion in said motor cylinder and a compressor piston portion in respective compressor cylinders, said motor piston portions facing each other and forming a combustion chamber for supplying gas under pressure, a receiver for the gases from said combustion chamber, a fuel measuring chamber, an injection piston movable therein under the influence of fuel under pressure for injecting the fuel in said measuring chamber into said combustion chamber, valve means having differential areas exposed to said fuel under pressure for preventing ejection of fuel from said measuring chamber, timing means controlled by said apparatus when said pistons are at combustion position for relieving the fuel pressure from one of said differential areas whereby said valve means opens and said injecting piston moves to produce said fuel injection, and means responsive to the pressure in said receiver for varying the timing of said pressure relieving means, governing means determining the initial position of said injecting piston in said measuring chamber for determining the volume of the fuel ejected therefrom, said governing means including a governor chamber and a governing piston therein biased to maintain the initial position of said injecting piston and movable in one direction for altering the initial position of said injecting piston to decrease the volume of fuel ejected from said measuring chamber, valve means controlled by the overtravel of said free pistons at the scavenging end of piston travel for supplying a pulse of fluid under pressure to said governing chamber thereby to move said governing piston in said one direction against its bias, and bleeding means associated with said governing chamber whereby said pulse of fluid is forced out of said governing chamber by said governing piston and its bias.

15. Gas generating apparatus comprising a motor cylinder, a pair of compressor cylinders respectively disposed at opposite ends of said motor cylinder, a pair of free pistons movable between combustion and scavenging positions, each piston including a motor piston portion in said motor cylinder and a compressor piston portion in respective compressor cylinders, said motor piston portions facing each other and forming a combustion chamber, means for synchronizing movement of said pistons, an injecting piston movable therein under the influence of fuel under pressure for injecting the fuel in said measuring chamber into said combustion chamber, timing means controlled by said generating apparatus when said pistons are at combustion position for effecting said fuel injection, governing means determining the initial position of said injecting piston in said measuring chamber for determining the fuel capacity thereof, said governing means including a governing chamber and a governing piston therein, said governing piston being biased to maintain the initial position of said injecting piston and being movable in one direction for altering the initial position of said injecting piston to decrease the capacity of said measuring chamber, and means responsive to non-synchronism tendencies of said free pistons for supplying fluid pressure to said governor chamber thereby to move said governing piston to effect reduction of said measuring chamber capacity of substantially zero.

16. Gas generating apparatus comprising a motor cylinder, a pair of compressor cylinders respectively at opposite ends of said motor cylinder, a pair of free pistons movable between combustion position and scavenging positions, each piston including a motor piston portion in said motor cylinder and a compressor piston portion in respective compressor cylinders, said motor piston portions facings each other and forming a combustion chamber for supplying gas under pressure, a receiver for the gases from said combustion chamber, a fuel measuring chamber, an injection piston movable therein under the influence of fuel under pressure for injecting the fuel in said measuring chamber into said combustion chamber, valve means having differential areas exposed to said fuel under pressure for preventing ejection of fuel from said measuring chamber, a timing valve plunger operated by said generating apparatus when said free pistons are at the combustion end, said timing valve plunger including a longitudinally angular slot for relieving the fuel pressure from one of said differential areas at said plunger operation thereby to effect opening of said valve means to produce fuel injection, means responsive to the pressure in said receiver for rotating said plunger for varying the timing of said pressure relief, governing means for determining the initial capacity of said fuel measuring chamber, and means responsive to the position of said free pistons at the scavenging end of piston travel for altering said initial fuel measuring chamber capacity.

17. Gas generating apparatus comprising a motor cylinder, a pair of compressor cylinders disposed respectively at opposite ends of said motor cylinder, a pair of free pistons movable between combustion position and scavenging positions, each piston including a motor piston portion in said motor cylinder and a compressor piston portion in respective compressor cylinders, said motor piston portions facing each other and forming a combustion chamber for supplying gas under pressure, a receiver for the gases from said combustion chamber, a fuel measuring chamber, an injection piston movable therein under the influence of fuel under pressure for injecting the fuel in said measuring chamber into said combustion chamber, valve means having differential areas exposed to said fuel under pressure for preventing ejection of fuel from said measuring chamber, a timing valve plunger operated by said generating apparatus, said timing valve plunger including a longitudinally angular slot for relieving the fuel pressure from one of said differential areas thereby to effect opening of said valve means to produce fuel injection, diaphragm means movable in response to the pressure in said receiver for rotating said plunger for varying the timing of said pressure relief, governing means for determining the initial capacity of said fuel measuring chamber, and means responsive to overtravel of said free pistons at the scavenging end of piston travel for reducing said initial fuel measuring chamber capacity.

LOUIS J. GARDAY.

REFERENCES CITED

The following references are of record in the file of this patent:

UNITED STATES PATENTS

| Number | Name | Date |
|---|---|---|
| 2,182,063 | Steiner | Dec. 5, 1939 |
| 2,200,892 | Pateras Pescara | May 14, 1940 |
| 2,355,177 | Pateras Pescara | Aug. 8, 1944 |
| 2,425,850 | Welsh | Aug. 19, 1947 |
| 2,426,297 | Cooper | Aug. 26, 1947 |

FOREIGN PATENTS

| Number | Country | Date |
|---|---|---|
| 551,519 | Great Britain | of 1943 |

Certificate of Correction

Patent No. 2,531,331                          November 21, 1950

LOUIS J. GARDAY

It is hereby certified that error appears in the printed specification of the above numbered patent requiring correction as follows:

Column 1, lines 44 and 45, after the word "measuring" insert *chamber*; column 2, lines 6 and 7, after "invention" insert *is*; column 3, lines 56 and 57, strike out "amount of fuel supplied to the engine thereby reducing the"; column 4, line 59, for "piston" read *pistons*; column 7, line 2, strike out the numeral "119"; column 8, line 70, strike out "an"; line 73, for "needle body 41" read *needle body 141*; column 9, line 17, for "ito" read *into*; column 12, line 74, for "latter" read *later*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*